United States Patent [19]

Plumly

[11] Patent Number: 4,967,317
[45] Date of Patent: Oct. 30, 1990

[54] EXIT SIGN

[75] Inventor: George W. Plumly, Granbury, Tex.

[73] Assignee: Genlyte, Secaucus, N.J.

[21] Appl. No.: 208,413

[22] Filed: Jun. 16, 1988

[51] Int. Cl.$^5$ .............................................. F21V 8/00
[52] U.S. Cl. ..................... 362/31; 362/252; 362/243; 362/812; 362/802; 40/550; 40/579; 40/570
[58] Field of Search ............... 362/812, 276, 235, 802, 362/252, 238, 246, 145, 147, 242, 243, 23, 245, 31, 26, 27; 40/541, 550, 570, 577, 579, 580, 581, 546

[56] References Cited

U.S. PATENT DOCUMENTS

| | | | |
|---|---|---|---|
| 844,940 | 2/1907 | Hotchner | 40/579 |
| 1,887,523 | 11/1932 | Schenkel | 40/577 |
| 2,893,148 | 7/1959 | Figman | 362/812 |
| 3,296,431 | 1/1967 | Green | 362/812 |
| 3,931,689 | 1/1976 | Shine | 40/570 |
| 4,201,005 | 5/1980 | Hunt | 40/570 |
| 4,587,753 | 5/1986 | Harper | 40/579 |
| 4,680,685 | 7/1987 | Altman | 362/351 |
| 4,724,629 | 2/1988 | Walton | 40/550 |

Primary Examiner—Ira S. Lazarus
Assistant Examiner—Diane M. Cox

[57] ABSTRACT

An illuminated exit sign having a novel layered arrangement including a multiplicity of miniature incandescent light bulbs. The light bulbs are mounted on a lamp assembly board in such a manner as to spell out the word "EXIT." A plastic sheet having holes therein is laid over the lamp assembly board, each of the bulbs entering a hole in the sheet. A stencil-type mask on top of the sheet defines the work "EXIT." When power is supplied, the bulbs provide direct illumination to the observer, and also diffuse light throughout the plastic sheet, providing background illumination of the lettering, with improved field of vision.

1 Claim, 2 Drawing Sheets

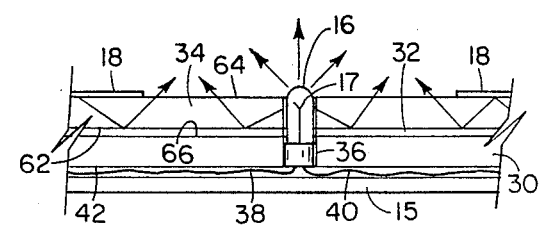
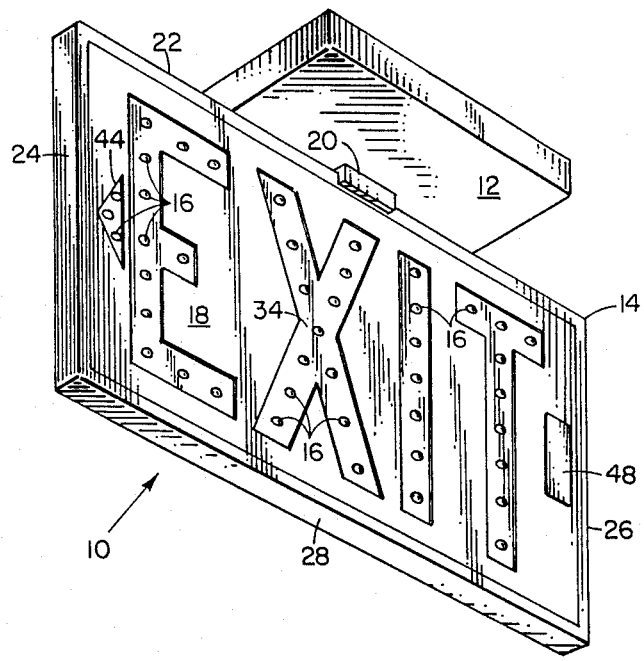
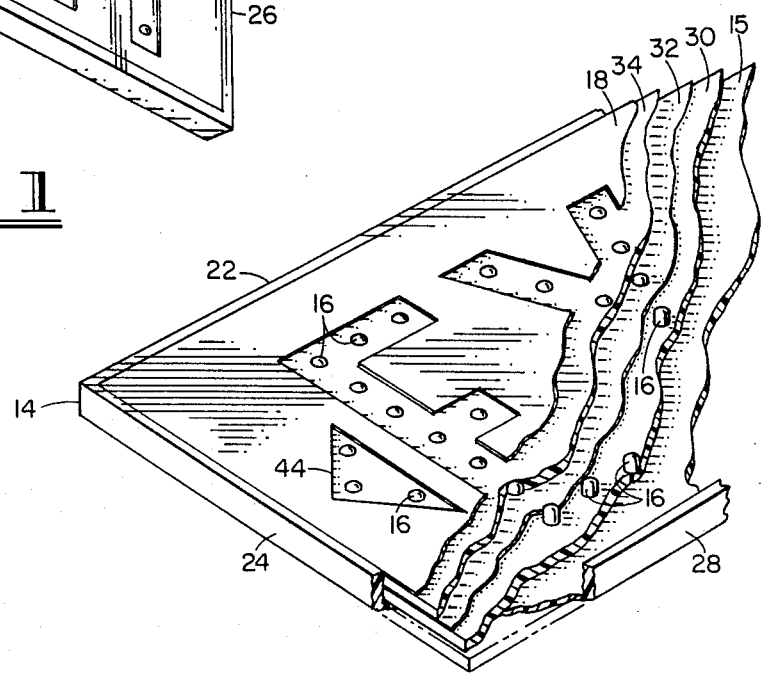
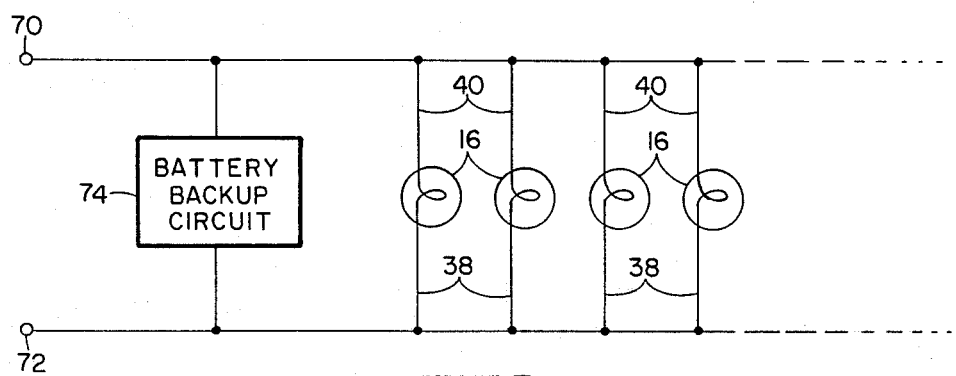

EXIT SIGN

BACKGROUND OF THE INVENTION

1. Field of the Invention

The present invention generally relates to lighting fixtures and signs, and more particularly to an improved exit sign having a multiplicity of miniature incandescent light bulbs.

2. Description of the Prior Art

Every state in America has certain regulations concerning the proper placement of exit signs. Such signs are used to insure safe and efficient evacuation of a building in case of an emergency, such as fire. For example, Texas Revised Civil Statutes Annotated article 3965 requires, inter alia, "at least one red light at each exit to each fire escape, and one guide sign for every twenty-five lineal feet of hallway or corridor leading to such fire escape."

Exit signs typically are box-shaped, with an outer metallic sheet having a cutout forming the word "EXIT." A translucent piece of red plastic lies adjacent to the outer sheet, and an incandescent light bulb inside the box illuminates the red plastic from behind. Arrows on the sign indicate the direction of the nearest fire escape. The light source is usually connected to an emergency power supply, or a battery backup. This satisfies the requirement of having both a guide sign and a red light, although sometimes a separate red light bulb is placed adjacent to a exit sign having external illumination only.

There are, however, several drawbacks to such prior art devices. First of all, if the light bulb within the sign (or the bulb providing external illumination) burns out, the device is practically useless. Although the word "EXIT" may still be discernable is good light, the purpose of the sign is to assist tenants under urgent conditions, such as a power black out, when no external light is available. Some exit sign manufacturers add a second light bulb to guard against such an occurrence, but there is still a chance that both bulbs will burn out. Furthermore, even if two bulbs are used, illumination of the sign is cut in half which may be critical when visibility is poor, e.g., in a smokey hallway.

The problem of smoke relates to another disadvantage of prior art exit signs. Even if all of the bulbs within the sign are working properly, output wattage of the bulb (typically measured in lamberts) is diminished by the transmission of the light through the translucent piece of red plastic. In other words, it is much more difficult to discern the pattern of the letters when using backlighting (or, for that matter, reflective illumination), as compared to direct viewing of the light bulb filament. Concentrated, bright light is necessary to penetrate the dense carbon particles suspended in the smoke.

A third limitation of prior art devices concerns the angle of viewing. According to Lambert's law, the luminous intensity in a given direction radiated or reflected by an illuminated surface varies as the cosine of the angle between that direction and the normal to the surface. In simpler terms, as one views the exit sign from more of a side angle, the intensity of the light decreases. Thus, there is a chance that persons looking in the direction of the sign, but at a side angle, will not perceive the sign to be an exit guide at all. It would, therefore, be desirable and advantageous to devise as exit sign overcoming the above limitations by providing a multiplicity of light bulbs arranged in a manner to yield increased brightness and an increased angle of viewing.

SUMMARY OF THE INVENTION

Accordingly, the primary object of the present invention is to provide an emergency exit sign.

Another object of the invention is to provide such a sign having a multiplicity of light sources whereby, if one of such light sources burns out, illumination of the sign will not be adversely affected.

Still another object of the invention is to provide an exit sign having an increased angle of viewing.

A further object of the invention is to provide such an exit sign which has increased brightness for improved visibility in smoke.

Yet another object of the invention is to provide an exit sign which requires little maintenance The foregoing objects are achieved in an exit sign having a multiplicity of miniature incandescent light bulbs embedded in a transparent sheet of plastic having a red background. The light bulbs slightly extend past the sheet so the filaments are directly visible. Light is reflected within the sheet from each of the bulbs, providing improved illumination of the entire sheet. A front mask has the word "EXIT" cutout thereof.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of illustrative embodiments when read in conjunction with the accompanying drawings, wherein:

FIG. 1 is a perspective view of the exit sign of the present invention.

FIG. 2 is a perspective cutaway of the present invention showing the layered arrangement thereof.

FIG. 4 is a schematic diagram of the electrical system of the present invention.

FIG. 5 is an enlarged cross-sectional view of a portion of the exit sign illustrating the internal reflection of incandescent light within the clear plastic layer.

DESCRIPTION OF THE PREFERRED EMBODIMENTS

Figure 3:
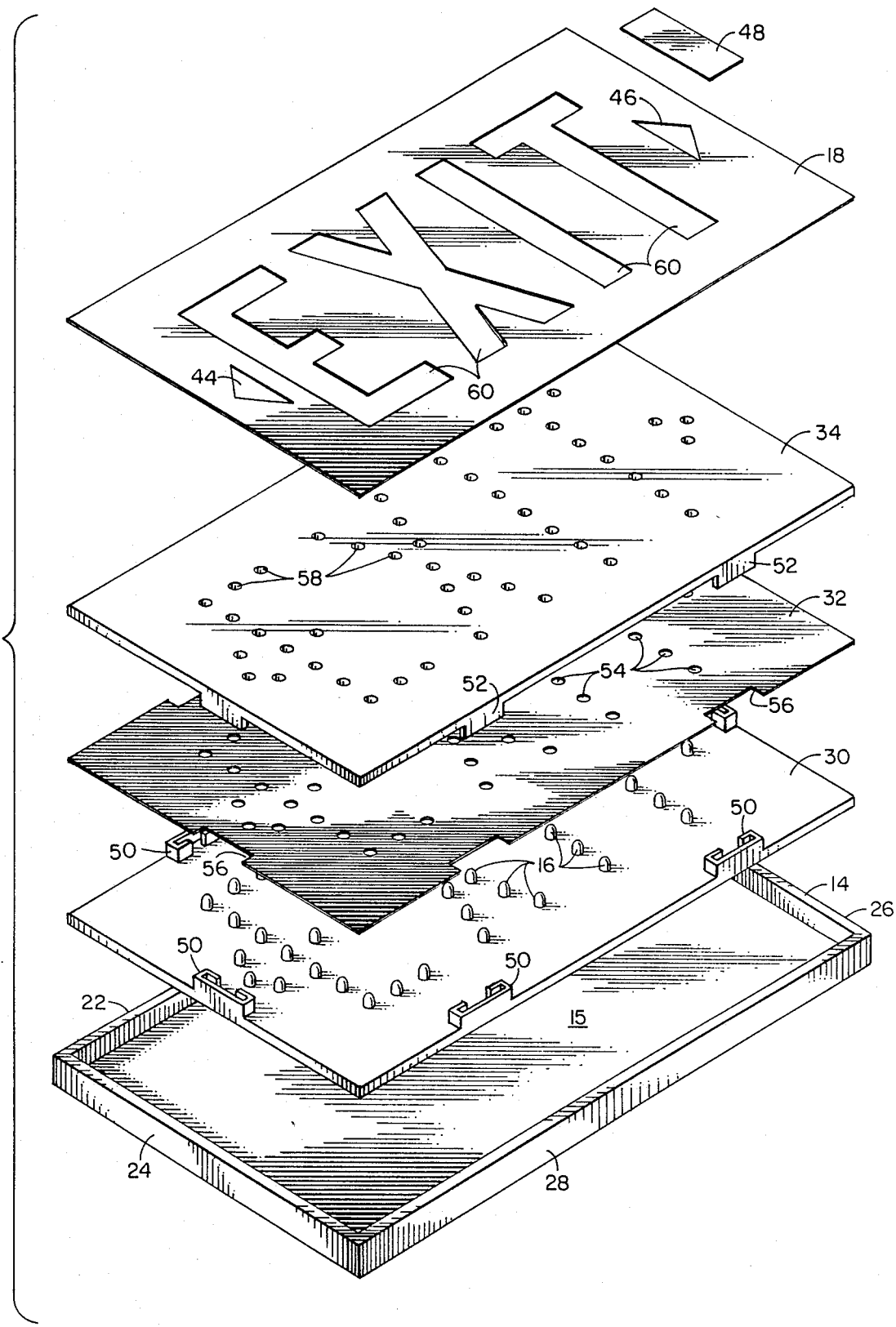
FIG. 3 is an exploded perspective view of the exit sign more clearly depicting the layers thereof.

With reference now to the figures, and in particular with reference to FIG. 1, there is depicted an exit sign 10. Exit sign 10 is generally comprised of a mounting plate 12, frame or housing 14, a plurality of miniature incandescent light bulbs 16, and several layers of plates or films, the uppermost layer being mask 18. Mounting plate 12 is simply a cover to be placed over the electrical power supply lines exiting from the ceiling, and may be any one of a number of different ornamental shapes. It is attached to the ceiling by any convenient means, and further includes a mounting bracket 20 for attachment to upper side 22 of frame 14. Of course, exit sign 10 could be constructed for mounting on a side wall, in which case mounting bracket 20 would simply be attached to one of the two sides 24 or 26 of frame 14.

Frame 14 may be constructed of any durable material, but it is anticipated that a stiff plastic would be used in most instances. In this matter, frame 14 may be injected molded or, alternatively, the backside 15 of frame 14 could be sheet extruded, and side 22, 24, 26, and 28 could be attached by such means as sonic welding. The inner surface of sides 22, 24, 26, and 28 is preferably white so as to optimize reflection qualities, as explained further below. For this reason, the entire frame 14 may be constructed of any white plastic, such as polyvinyl chloride, polyethylene, or polyethersulfone, although it could also be formed of other appropriate materials, such as metal. In the preferred embodiment, the backside 15 of frame 14 is about one-eighth of an inch thick, and the dimensions of frame 14 may vary from as small as three inches by five inches to as large as one foot by two feet. The particular dimensions used depend on applicable safety regulations and costs considerations, as well as available space at the placement site.

Light sources 16 are clear incandescent bulbs approximately one-quarter of an inch long, and are arranged in such a manner as to form the letters "E", "X", "I" and "T" as shown. The electrical wiring of light bulbs 16 is discussed below in conjunction with FIG. 4. Although they may be colored (e.g., red), they are preferably clear. In order to optimize viewing of exit sign 10 in smokey conditions, light bulbs 16 should not be frosted, but rather the filaments therein should be directly visible. They must be somewhat elongated in order to extend through holes in a special refractive sheet as described below in conjunction with FIG. 5. Bulbs 16 are preferably low voltage bulbs which increases their useful life.

With further reference now to FIG. 2 and FIG. 3, the various internal layers of exit sign 10 are explained. FIG. 2 is a perspective view with a cutaway showing the layered arrangement of exit sign 10, and with the side portions 22, 24, 26, and 28 of frame 14 removed for clarity. FIG. 3 is an exploded perspective view. In the preferred embodiment, exit sign 10 has five layers: the bottom most portion which is simply the backside 15 of frame 14; a lamp assembly board 30; film 32; clear plastic sheet 34; and mask 18.

Frame 14 is described above, and is immediately adjacent to lamp assembly board 30. Each of the light bulbs 16 is mounted on lamp assembly board 30, which is preferably constructed of ABS (acrylonitrile butadiene styrene) plastic. Practically any other material would be suitable. The only limitation in this respect is that lamp assembly board 30 must not be entirely electrically conductive as this would short out the power supply to light bulbs 16. Lamp assembly board is approximately one-eighth of an inch in thickness.

As shown in FIG. 5, bulbs 16 may be inserted into small cavities 36 in lamp assembly board 30, and then plastic welded into place. Each bulb has two wires 38 and 40 emanating from the lower surface 42 of lamp assembly board 30, leading the power supply. In an alternate version, lamp assembly board may be equipped with a plurality of embedded sockets which would receive wireless bulbs. This allows for simpler repair of burned out bulbs. In such an embodiment, lower surface 42 of lamp assembly board 30 could have wiring etched thereon, similar to conventional printed circuit boards. This embodiment, however, is generally deemed impractical in light of the anticipated extensive lifetime of the bulbs to be used, as discussed further below.

The positioning of bulbs 16 on lamp assembly board 30 depends on the message to be spelled out. Generally, this will be the word "EXIT," but the novelty of the present invention is not limited to any particular message. Thus, while the primary anticipated use of the device is as an exit sign, other messages may be displayed. Certainly, foreign equivalents of the word "exit" will be used in other countries.

Extra bulbs may be placed on either side of the word "EXIT" in order to form arrows 44 and 46 pointing in the direction of the fire escape. A baffle plate 48 is placed over one of the arrows where appropriate, as shown in FIG. 1. If exit sign 10 is placed directly overr the fire escape, then two baffle plates 48 may be used to conceal arrows 44 and 46.

Lamp assembly board 30 may also be provided with female brackets 50 which mate with tabs 52 on sheet 34. Lamp assembly board 30, film 32, and sheet 34 are thereby secured to one another. Brackets 50 and tabs 52 also maintain proper spacing between lamp assembly board and sheet 34, which is critical to the invention as explained below.

Film 32 is simply a very thin layer of red plastic. Other colors may be used but, due to statutory requirements, it is anticipated that the lettering of exit sign 10 will be red. Film 32 may be either transparent or opaque. This is discussed further in conjunction with FIG. 5. Film 32 has a plurality of holes 54 therein allowing passage of bulbs 16, and several cutouts 56 which accommodate brackets 50.

Sheet 34 is constructed of any clear material, preferably a plastic, such as LEXAN, a trademark for a polycarbon laminate. Sheet 34 should be totally transparent, so that it may transmit and internally reflect the light from bulbs 16. Sheet 34 also has holes 58 for receiving the filament end of bulbs 16. Sheet 34 need only be approximately one-eighth of an inch thick, and its length and width are identical to the dimensions of backside 15 of frame 14.

Mask 18 is a very thin film of white plastic which is attached to sheet 34 by an appropriate adhesive. It is preferably white so that the underside will promote internal reflection of light within sheet 34 as alluded to above. Mask 18 is similar to a stencil in that cutout portions 60 define lettering which spells out the word "EXIT." Of course, cutouts 60 must match the lamp array of bulbs 16 on lamp assembly board 30. Cutouts 60 are much wider than the diameter of bulbs 16, however, providing an illumination field surrounding bulbs 16. Cutouts 60 include arrow indicators 44 and 46 discussed above. Mask 18 is totally opaque so as to provide maximum contrast with the illuminated lettering.

In an alternative embodiment, film 32 and mask 18 are replaced by paint-like coatings sprayed directly onto the surfaces of sheet 34. A red paint may be sprayed over the entire lower surface 62 of sheet 34 which is adjacent to lamp assembly board 30, while a white paint may be sprayed on the visible upper surface 64. Conventional silkscreen techniques may be used to selectively coat upper surface 64 with the exit message and arrow indicators. A further alternative is to spray the upper surface 66 of lamp assembly board 34 with red paint, rather than lower surface 62 of sheet 34.

With reference now to FIG. 4, a schematic diagram is presented showing the electrical wiring of exit sign 10. External power is supplied at poles 70 and 72. Typically, the power supply is provided by standard wiring in the ceiling to which mounting plate 12 is attached, which is, in most cases, 120 or 277 volts AC. The actual voltage at the lamps is approximately 3.2 volts AC. The lamps are preferably rated for 10,000 at 5 volts (AC or DC), but provision of 3.2 volts AC has been found sufficient for the purposes described herein. Moreover, it has been empirically proven that the lifetime of a lamp is proportional to the ratio of the rated voltage to the actual voltage, raised to the 12th power, i.e., in our case, the lifetime of the bulbs is increased by a factor of $(5.0/3.2)^{12} = 330.9$. The lifetime of bulbs 16 is thus projected many years.

Power is supplied to each of the bulbs 16 in a parallel fashion, as shown. In this manner, if one bulb burns out, the other bulbs will not be affected thereby. Power is also provided to a battery backup circuit 74 as shown. As those skilled in the art will appreciate, battery backup circuit 74 is not only recharged by the main power supply, but also monitors the power input. Thus, if a power failure should occur, battery backup circuit 74 is activated and provides temporary power for illumination of exit sign 10. Battery backup circuit 74 is rated at 4 volts (starting voltage of approximately 4.4 volts, with a cut-off voltage of 3.75 volts).

The novelty of the present invention is best illustrated in FIG. 5, to which attention is now directed. Light rays from bulb 16 emanate either directly outward toward the observer or into the surrounding sheet 34. Thus, when vision is restricted by smoke, the general pattern of the lettering is much more recognizable than with prior art devices due to direct viewing of the filament. At the same time, however, a portion of the light is trapped within sheet 34, and internally reflected off film 32, creating a red tint. The red light eventually exits sheet 34 at those portions not covered by mask 18. Moreover, light from other bulbs, including those bulbs defining an adjacent letter, travels under mask 18 and exits through an adjacent cutout. This is illustrated in FIG. 5 by the two light rays approaching from the sides of the figure. In other words, sheet 34 acts as a light guide to disperse light from all bulbs 16 throughout sheet 34.

In addition to the improved visibility in smokey conditions, the unique structure disclosed herein has two further distinct advantages. The first is that, if one or two light bulbs 16 burn out, exit sign 10 is virtually unaffected thereby. Light from surrounding bulbs will maintain illumination of the lettering even at those areas of local bulb burnout.

The second advantage relates to field of vision. Generally speaking, the luminous intensity radiated or reflected by an illuminated surface decreases as the observer views the surface from more acute angles. This is known as Lambert's law. Thus, with prior art devices, it is more difficult to discern the message on exit signs. The present device, however, approaches more closely the ideal Lambert surface, where light is perfectly diffused and intensity is independent of viewing direction. By way of comparison, prior art devices offer an acceptable field of view only up to 45°, while the present invention offers improved visibility of up to 80°.

The ability of exit sign 10 to act as a Lambert surface is dependent upon two primary factors: the index of refraction of the sheet material 34, and the location of the filament 17 of bulb 16. With respect to the first parameter, it is well known that internal reflection of light in a transparent medium is dependent upon the ratio of the index of refraction of that medium to the index of refraction of the surrounding air. For example, by using the polycarbonate material LEXAN, any internal radiation which strikes the upper surface 64 of sheet 34 is reflected back inside sheet 34 provided the internal angle of incidence is greater than approximately 38° (based on an index of refraction of 1.60). This holds true whether the light is clear (white light), as emanating directly from bulb 16, or the light is red, as reflected off film 32. Inasmuch as most commercial plastics have an index of refraction near that of LEXAN (the indices vary from about 1.4 to 1.6), this factor is not particularly critical; nevertheless, materials having an extreme (i.e., very high or very low) index of refraction should be avoided. In theory, materials with a very high index will reflect nearly all of the light internally, allowing only that light to escape which strikes upper surface 64 at a nearly normal angle (consequently reducing the intensity of observed light). Materials with a particularly low index of refraction will provide insufficient internal reflection, meaning less dispersion of light evenly within sheet 34.

The second factor, relative location of the filament, is related to the first, but is much more important. If bulb 16 is so long that filament 17 is raised above upper surface 64, then very little light will be able to enter sheet 34, and the light that does enter will have a very low angle of incidence, meaning that it will not be internally reflected at all. Conversely, if bulb 16 is particularly short and filament 17 is located near or below lower surface 62 of sheet 34, light entering sheet 34 will again have a low angle of incidence, and most of it will escape immediately without internal reflection. For this reason, the height of light bulbs 16 above lamp assembly board 30 should be such that the filament is located about half-way between layer and upper surfaces 62 and 64 of sheet 34.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description of the invention. It is therefore contemplated that the appended claims will cover such modifications that fall within the true scope of the invention.

I claim:

1. An illuminated exit sign comprising:

a lamp assembly board having upper and lower surfaces;

a plurality of elongated incandescent light bulbs mounted on said upper surface of said lamp assembly board and being arranged to form the word "EXIT", each of said bulbs having a filament;

a transparent sheet of plastic having upper and lower surfaces, and having a plurality of holes therein, said holes located so as to receive said plurality of light bulbs when said lower surface of said transparent sheet is placed adjacent to said upper surface of said lamp assembly board, the thickness of said transparent sheet being such that each of said filaments is disposed entirely within said thickness of said transparent sheet between said upper and lower surfaces, said transparent sheet further being made of a material with internal reflection properties;

a thin red film interposed between said lamp assembly board and said transparent sheet, said film having a plurality of holes therein corresponding to said holes in said transparent sheet;

an opaque mask layer affixed to said upper surface of said transparent sheet, said mask layer having cutouts demarcating the work "EXIT", said cutouts overlying said light bulbs, the length and width of said lamp assembly board, said transparent sheet, said film, and said mask layer being approximately equal;

wiring means for connecting each of said light bulbs in parallel to an external power source;

bracket means formed integrally on the front and side of said board for securing said board, said red film, and said sheet to one another with tab means integrally formed on the back side of said sheet, fitting into said bracket means;

a frame for housing said board, said light bulbs, said red film, said sheet, said mask layer, and said wiring means;

means for mounting said frame means to a supporting surface; and battery means for supplying electrical power to said incandescent light bulbs when said external power supply fails.

* * * * *